United States Patent [19]
Goto

[11] 3,964,451
[45] June 22, 1976

[54] INTERNAL COMBUSTION ENGINE WITH A SUPERCHARGER

[75] Inventor: Kenji Goto, Susono, Japan

[73] Assignee: Toyota Jidosha Kogyo Kabushiki Kaisha, Japan

[22] Filed: Dec. 13, 1973

[21] Appl. No.: 424,204

[30] Foreign Application Priority Data
Aug. 9, 1973  Japan.............................. 48-93103

[52] U.S. Cl. .............................. 123/75 B; 123/26; 123/119 DB; 123/124 R
[51] Int. Cl.² ........................................ F02D 33/02
[58] Field of Search........... 60/605, 606; 123/119 C, 123/119 CE, 124 R, 119 DB, 32 ST, 22, 26, 75 B

[56] References Cited
UNITED STATES PATENTS

| | | | |
|---|---|---|---|
| 982,251 | 1/1911 | Coffee............... | 123/75 B |
| 1,562,692 | 11/1925 | de Rochefort-Lucay......... | 123/75 B |
| 1,752,082 | 3/1930 | Herkt.................... | 60/605 |
| 1,781,147 | 11/1930 | Zaikowsky............... | 123/75 B |
| 1,910,279 | 5/1933 | Büchi..................... | 60/605 |
| 2,196,071 | 4/1940 | Hudson.................. | 123/32 ST |
| 2,453,377 | 11/1948 | Lozivit.................. | 123/119 CE |
| 2,553,896 | 5/1951 | Coquille............... | 123/119 DB |
| 2,873,574 | 2/1959 | Webb.................... | 60/606 |
| 2,927,569 | 3/1960 | Grauel................. | 123/119 C |
| 3,052,224 | 9/1962 | Van House............ | 123/119 C |
| 3,266,234 | 8/1966 | Cook..................... | 60/605 |
| 3,672,172 | 6/1972 | Hammond............... | 123/119 C |

FOREIGN PATENTS OR APPLICATIONS

| | | | |
|---|---|---|---|
| 11,952 | 5/1916 | United Kingdom........... | 123/75 B |

*Primary Examiner*—Carlton R. Croyle
*Assistant Examiner*—O. T. Sessions
*Attorney, Agent, or Firm*—Kenyon & Kenyon et al.

[57] ABSTRACT

An internal combustion engine provided with a supercharging system in which each cylinder head of the engine cylinders is provided with a valve controlled subordinate port connected to a pressurized intake air supply source, and valve actuating means actuates each valve of the subordinate inlet ports shortly before the piston within each cylinder comes into a compression stroke thereof so that the pressurized air flowing into the cylinder agitates and attenuates the fuel mixture sucked from the valve controlled inlet port.

2 Claims, 5 Drawing Figures

U.S. Patent  June 22, 1976  Sheet 1 of 2  3,964,451
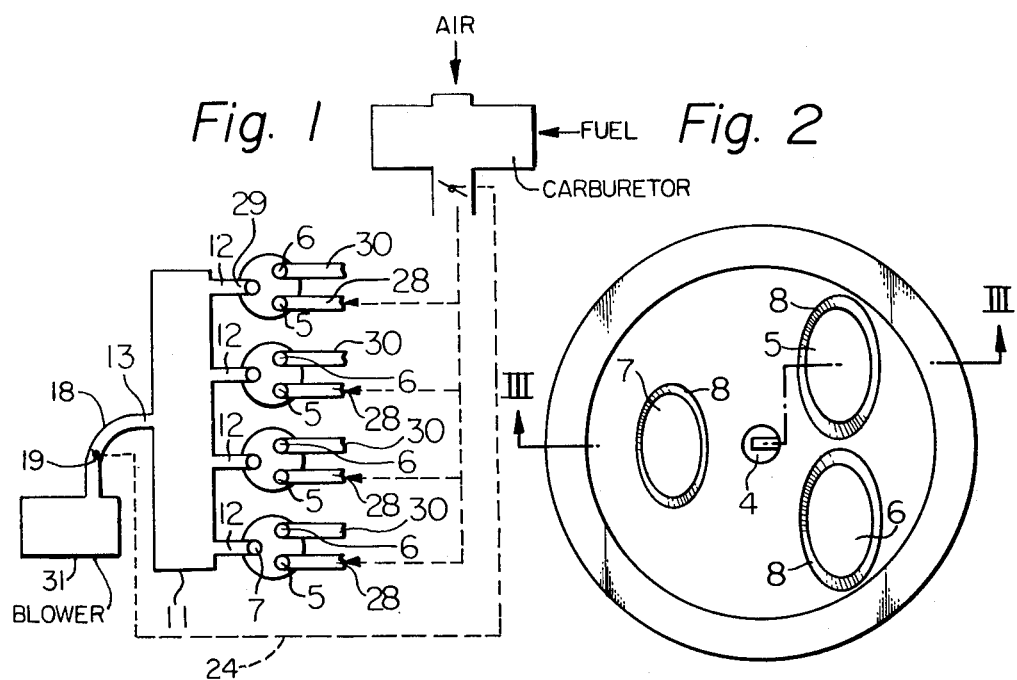
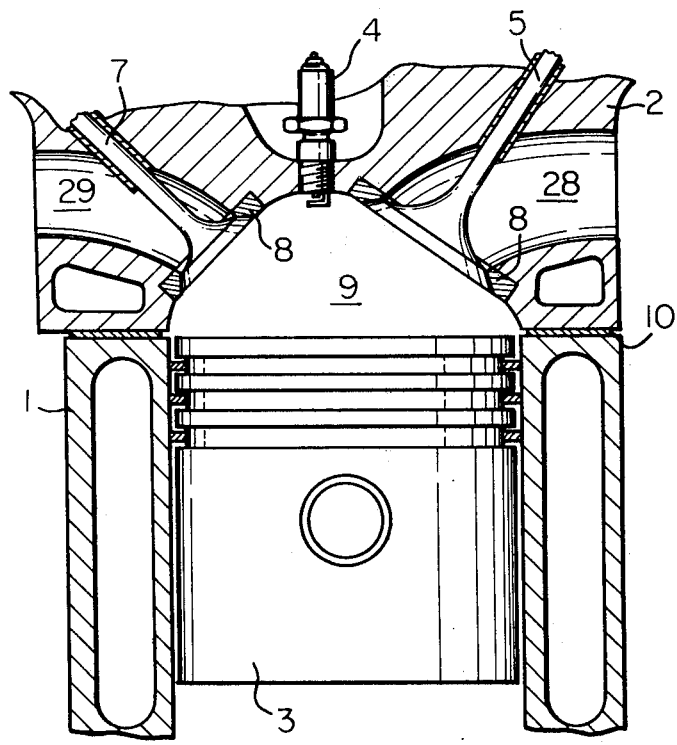

INTERNAL COMBUSTION ENGINE WITH A SUPERCHARGER

The present invention relates to an internal combustion engine with a supercharger.

In the field of an internal combustion engines, supercharging, that is, compressing the intake air within engine cylinders to the extent of more than atmospheric pressure is often carried out in order to increase the power of the engine. Especially, many diesel engines are provided with superchargers.

However, gasoline engines for use in vehicles are seldom provided with superchargers other than particular engines, such as racing-car engines and airplane engines. This fact comes mainly from the following reasons.

1. In gasoline engines, provision of carburetors is usually required for producing the fuel mixture. However, compression of the intake air taking place upstream of the carburetor results in large changes in the pressures applied to the float chamber and the venturi of the carburetor, depending upon various operating conditions of the engine. In a carburetor, since the performance characteristic thereof is affected by the parameters, such as density and pressure, of the intake air flowing into the carburetor, large changes of such parameters make it difficult to maintain the calibrated air-fuel ratio. If compression of the intake air takes place upstream of the carburetor, it happens that the carburetor cannot operate so as to fit every operating condition of the engine.

2. Also when compression of the intake air is carried out upstream of the carburetor, such supercharging produces a high pressure within the carburetor and it is therefore, difficult to maintain tight sealing of the carburetor.

3. When the compression of the intake air is carried out between the carburetor and the intake valves of the engine, many problems may occur, since the intake air has already been mixed with the fuel by the carburetor.

4. If the total amount of the intake air is supplied to an engine by way of a supercharger, the supercharger will become very large if the supercharger is a displacement type pump, such as a Roots blower or a vane pump. As a result, the arrangement of such a supercharger within an engine compartment is very difficult.

Recently, in order to purify exhaust gas, a strong desire has arisen to find some way of carrying out combustion in internal combustion engines using a lean fuel mixture. However, this is difficult because lean fuel mixtures are poor in combustibility and, therefore, such mixtures often fail to be ignited in a conventional gasoline engine. Further, combustion of a leaner mixture in a gasoline engine results in poorer performance.

In the case of such lean fuel mixture, it is easily understood that application of supercharging increases the power of the engine as well as the combustibility of the lean mixture as the pressure of the mixture rises. Simultaneously, it is true that supercharging can be advantageous for purifying the exhaust gas from the engine.

In view of the foregoing, it is an object of the present invention to provide an internal combustion engine with a supercharger according to which a gasoline engine may not only obtain a supercharging effect simply by use of a small supercharger but also fit all of the operating conditions required for the gasoline engine.

The present invention will be described by way of an embodiment with reference to the accompanying drawings in which:

FIG. 1 is a schematic and partial plan view of an embodiment of an internal combustion engine with a supercharger according to the present invention;

FIG. 2 is a schematic bottom view of a cylinder head of the engine of FIG. 1;

FIG. 3 is a vertical cross sectional view taken along the line III—III of FIG. 2;

Figure 4:
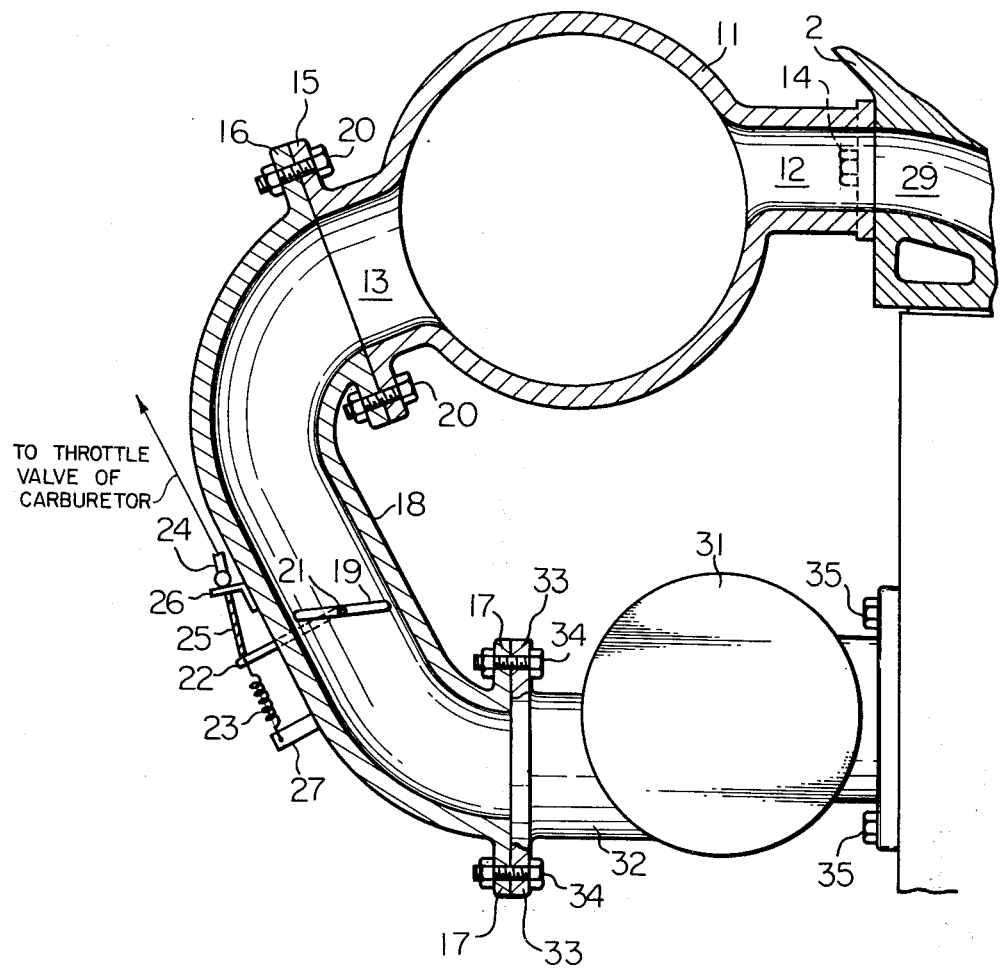
FIG. 4 is a schematic and cross sectional view of the conduit means between the cylinder head and the supercharger provided for the engine of FIG. 1.

In FIG. 1 through FIG. 3, the numeral 1 is a cylinder of an internal combustion engine according to the present invention. The engine is provided with a cylinder head 2 mounted on the top of the cylinder 1 via a sealing gasket 10. A piston 3 is reciprocally fitted in the cylinder 1. The cylinder head 2 is provided with an inlet valve 5, an exhaust valve 6, a subordinate valve 7 for suction of a pressurized intake air, an inlet port 28, a subordinate inlet port 29, and an exhaust port 30. The valves 5, 6 and 7 are arranged so as to be actuated by means of the well known valve actuating means including a push-rod and a rocking arm.

In FIGS. 2 and 3 the numeral 8 designates a seat for each valve, and the numeral 9 designates a combustion chamber provided with a spark plug 4 on the top thereof. An air chamber 11 having a capacity sufficient for temporarily storing the pressurized air, serves as a pressurized air supply source for each cylinder 1. The air chamber 11 is provided with an entrance pipe 13 and the same number of distribution pipes 12 as cylinders 1. Further, referring to FIG. 4, it is shown that the air chamber 11 is fixedly mounted on cylinder head 2 by means of bolts 14 so that each distribution pipe is connected to each subordinate inlet port 29. The reference numeral 18 designates a bent pipe provided with flange parts 16 and 17, and a regulating valve 19 arranged therein. The one flange part 16 is connected to a flange part 15 of the entrance pipe 13 of the chamber 11. The regulating valve 19 is provided with an axle 21 having a lever 22 provided at the outside of the bent pipe 18. To the outermost end of the lever 22, one end of a spring 23 and one end of a core cable 25 of a push-pull cable 24 are secured respectively. The push-pull cable 24 is carried by a bracket 26 fixed to the side part of the bent pipe 18. The other end of the spring 23 is connected to a bracket 27 disposed so as to be opposed to the bracket 26 with respect to the lever 22 and fixed to the side part of the bent pipe 18. The other end of a core cable 25 of the push-pull cable 24 is connected to a throttling linkage of the carburetor so that the motion of the regulating valve 19 is interconnected with the motion of the throttling valve of the carburetor. The flange 17 of the bent pipe 18 is secured to a flange 33 provided at the end of an output 32 of a supercharger 31 by means of bolts and nuts designated by a reference numeral 34. The supercharger 31 is fixed to the cylinder block by means of bolts 35. The supercharger 31 may be a Roots pump or a vane pump which operates so as to produce appropriately pressurized air. Further, the supercharger 31 may be driven by the engine through a transmission using a belt or gears.

In FIG. 4, on the opposite side to the air chamber 11, the cylinder head 2 is provided with an intake manifold (not shown) having a carburetor (not shown), and an exhaust manifold (not shown) similar to the known engine. Of course, the intake manifold is connected to each inlet port 28, and the exhaust manifold is connected to each exhaust port 30. The carburetor may have the same structure as the known one, but should be adjusted so that the mixing ratio is slightly richer in the case of use with the present invention.

Thus according to the arrangement of FIG. 4, the supercharger 31 supplies pressurized intake air into the vent pipe 18. Then, the pressurized air flowing in the vent pipe 18 reaches the regulating valve 19, the angular position of which is determined by that of the throttling valve in the carburetor. Therefore, the pressure of the pressurized air passing through the opening formed between the internal face of the vent pipe 18 and the regulating valve 19 is reduced to a certain value determined by the angular position of the valve 19. That is, it should be understood that as the regulating valve 19 is interconnected with the throttling valve within the carburetor, the ratio between the pressure of the pressurized air passing through the opening of the valve 19 and the pressure of the fuel mixture in the intake manifold can be regulated to a certain constant value. The pressurized intake air supplied from the supercharger 31 and having flown through the vent pipe 18 via the regulating valve 19 comes into the air chamber 11 so that the pulsation of the pressurized intake air is absorbed while the pressurized intake air is temporarily stored in the air chamber 11. The pressurized intake air within the air chamber 11 is subsequently distributed to each subordinate inlet port 29 of the cylinder head 2 through each distribution pipe 12. Here, it should be noted that since the pressurized intake air is temporarily stored in the air chamber 11 and the pulsation of the pressurized intake air is absorbed in the air chamber 11, the amount of the pressurized air distributed to each subordinate inlet port 29 is equalized.

Figure 5:
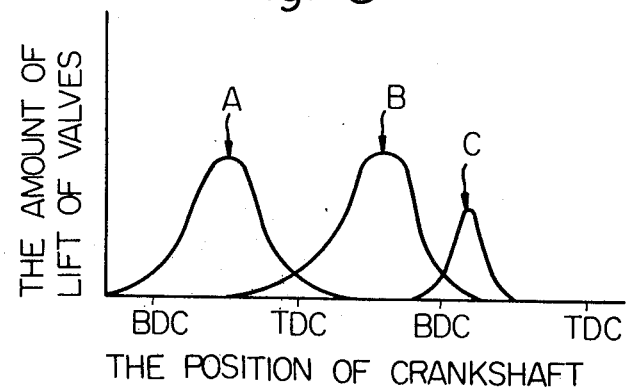
FIG. 5 is an explanatory diagram showing an operational sequence of the valves provided for the engine of FIG. 1.

Now the operation of the valve operating means for inlet, exhaust and subordinate inlet valves 5, 6 and 7 are explained with reference to FIG. 5. In FIG. 5, the abscissa shows the angular position of the crankshaft of the engine according to the present invention (BDC refers to the bottom dead center and TDC refers to the top dead center), and the ordinate shows the amount of lift of each valve.

As is shown by the curve A, the exhaust valve 6 commences to open shortly before the piston 3 reaches BDC after completion of the combustion stroke, and exhausts the burnt gas in response to the upward movement of the piston 3 toward TDC. The exhaust valve 6 closes when the piston 3 is slightly past TDC. The curve B shows the operation of the inlet valve 5. The inlet valve 5 commences to open shortly before the piston 3 reaches TDC in the end of the exhaust stroke thereof, and sucks the fuel mixture from the inlet port 28 in response to the downward movement of the piston 3 within the cylinder 1. The inlet valve 5 closes when the piston is slightly past BDC. The above described valve timing of the inlet and exhaust valves 5 and 6 is completely the same as the known engine. However, according to the present invention, the subordinate valve 7 is operated by the valve actuating means (not shown) as shown by the curve C in FIG. 5. That is, the subordinate valve 7 commences to open when the piston 3 comes adjacent to BDC (about 20° before BDC) in the suction stroke thereof, and the opening of the valve 7 reaches the maximum when the piston 3 moves slightly upward after passing BDC. Then, the valve 7 closes (at about 50° after BDC) while the piston moves further upward, as shown by the curve C of FIG. 5.

The operation of an engine with a supercharger according to the present invention will now be explained.

When the piston 3 begins to perform the suction stroke thereof, the fuel mixture is introduced from the inlet valve 5. The fuel mixture is put into a slightly richer condition according to the present invention, compared with the general condition of the known engine. Subsequently, when the piston 3 comes into the compression stroke after completion of the suction stroke, the subordinate valve 7 opens. Thus, the pressurized intake air flows into the cylinder 1 through the opening of the subordinate valve 7, since the pressurized air produced by the supercharger 31 has been introduced into the subordinate inlet port 29. The pressurized air continues to flow into the cylinder 1, until the compression pressure within the cylinder 1 due to the compression stroke of the piston, is equal to the pressure of the pressurized air. In this case, when the inertia of the pressurized air, which appears during flowing of the pressurized air into the cylinder 1 is taken into consideration the pressurized air continues to flow into the cylinder 1 until the above-mentioned compression pressure exceeds that of the pressurized air. When the subordinate valve 7 closes, the flow of the pressurized air into the cylinder 1 is completed. At this time, it should be noted that as the ratio between the pressure of the fuel mixture within the inlet port 28 and that of the pressurized air within the subordinate inlet port 29 is regulated to a constant condition due to the interconnection of the throttling valve and the regulating valve 19, the ratio between the amount of the fuel mixture sucked into the cylinder and the amount of the pressurized air is always kept constant, if the amount of lift of the valves 5 and 7, and their timing are not varied. Consequently, in the cylinders 1 of an engine according to the present invention, the fuel mixture is agitated and attenuated by the pressurized air so that a fuel mixture having a constant and leaner fuel-air ratio is produced. The attenuated fuel mixture, then undergoes compression by the piston 3 and subsequently is ignited by the ignition plugs 4 so as to carry out a complete combustion within the cylinders 1. After the combustion, the burnt exhaust gas is exhausted via the exhaust valve 6 in the same manner as the known engine.

In accordance with an engine of the present invention carrying out the aforementioned operation, the following diverse effects can be provided.

i. When the engine comes to the TDC point of the compression stroke, the fuel mixture pressure can be higher than the case where combustion of the conventional lean fuel mixture is carried out in the known engine. As a result, the ignition of the fuel mixture easily takes place, although the fuel mixture is attenuated by the pressurized air.

ii. The fact of (i) above, ensures that in the engine of the present invention a combustion of a much more attenuated fuel mixture than the conventional lean fuel mixture may still be attained so that purification of the exhaust gas is accomplished by the use of such extremely attenuated fuel mixture.

iii. In the cylinders of the engine of the present invention, the fuel mixture can contain a rich fuel charge due to supercharging and, as a result, an increase in the power of the engine can be obtained.

iv. In the usual car engine, the inlet ports and the exhaust ports are both disposed at one side of the cylinder head, and at the other side of the cylinder head, the space is occupied by the distributor, the oil cleaner and the like elements. However, these elements can easily be removed to another appropriate space within an engine compartment of the car. Therefore, arranging the supercharger 31, the air chamber 11, and the vent pipe 18 in the space adjacent to the cylinder head, results in very effective efficient use of the engine compartment.

v. In the present invention, the supercharger 31 does not compress the whole amount of intake air introduced into the cyliners 1. This fact enables the supercharger to be of small capacity and of small size. Consequently, since the supercharger does not occupy a large space in the engine compartment, the supercharger can be easily adopted to an engine having cross-flow type combustion chambers.

vi. In the arrangement of the engine of the present invention, the carburetor is independent of the supercharging system. From this fact, the pressurized air from the supercharger is never introduced into the carburetor and, consequently, the fuel mixture produced by the carburetor is never directly compressed by the supercharger. As a result, all of the problems recited in the introduction of the present description do not occur.

What is claimed is:

1. A spark ignition four stroke cycle internal combustion engine of the type that includes a plurality of cylinders, pistons reciprocal in the cylinders; a carburetor having a throttle valve; a cylinder head mounted on the cylinders, said cylinder head having a combustion chamber defined therein for each cylinder, an inlet port leading to each combustion chamber, an intake valve for supplying fuel and air mixture from the carburetor through each intake port, an exhaust port leading from each combustion chamber, and an exhaust valve for exhaust of burnt gas through each exhaust port wherein the improvement comprises:

the carburetor being adjusted to supply a rich fuel and air mixture to the combustion chambers through the intake ports and supercharging means, the supercharging means comprising an air blower for supplying said pressurized intake air, subordinate ports in the cylinder head opening into each combustion chamber, an air chamber for temporarily storing said pressurized intake air supplied from said air blower, said air chamber being connected to each of said subordinate ports of said cylinder head, a vent pipe connecting said air blower and said air chamber, a regulating valve disposed in said vent pipe, said regulating valve being interconnected with the throttling valve of said carburetor for regulating the amount of pressurized air supplied through the subordinate ports to the combustion chambers in proportion to the amount of fuel and air mixture supplied from the carburetor through the intake ports, an air valve in each subordinate port for said pressurized intake air to flow into the corresponding combustion chamber when the valve of said subordinate port is open, and means for actuating each air valve of said subordinate ports to be open only during a period in each cycle from before the end of the intake stroke through a portion of the compression stroke by the piston in the corrsponding cylinder for supplying sufficient additional air under pressure to the combustion chamber for thoroughly mixing with the fuel and air mixture to produce a combustible supercharged lean fuel and air mixture prior to the commencement of the expansion stroke.

2. A spark ignition fourstroke cycle internal combustion engine of the type that includes a plurality of cylinders, pistons reciprocal in the cylinders; a carburetor having a throttle valve; a cylinder head mounted on the cylinders, said cylinder head having a combustion chamber defined therein for each cylinder, an inlet port leading to each combustion chamber, an intake valve for supplying fuel and air mixture from the carburetor through each intake port, an exhaust port leading from each combustion chamber, and an exhaust valve for exhaust of burnt gas through each exhaust port wherein the improvement comprises:

the carburetor being adjusted to supply a rich fuel and air mixture to the combustion chambers through the intake ports and supercharging means comprising means for producing a supply of pressurized intake air;

a subordinate port opening into each of said combustion chambers, said subordinate port being connected with said means for producing pressurized intake air;

an air valve in the subordinate port for permitting said pressurized intake air to flow into said combustion chamber when the valve is open; and means for actuating each air valve of said subordinate ports to open said valve only during a period in each cycle from prior to commencement of the compression stroke of the corresponding piston through an initial portion of the compression stroke for supplying sufficient additional air under pressure to the combustion chamber for thoroughly mixing with the fuel and air mixture to obtain a readily combustible supercharged lean fuel and air mixture prior to the commencement of the expansion stroke, and to shut said valve when the pressure in the cylinder during the compression stroke exceeds the pressure of the supply of pressurized air as a result of the inertia of the inflowing air, thereby supplying a maximum amount of additional air at the supercharging pressure.

* * * * *